G. CULLI.
WHIFFLETREE.
APPLICATION FILED SEPT. 6, 1911.
1,061,166.
Patented May 6, 1913.
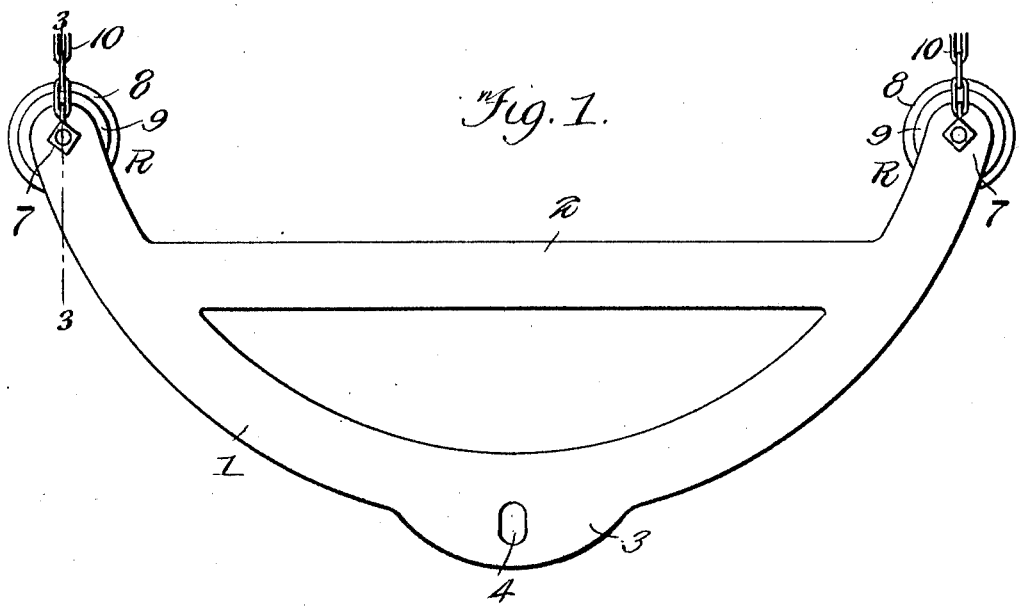
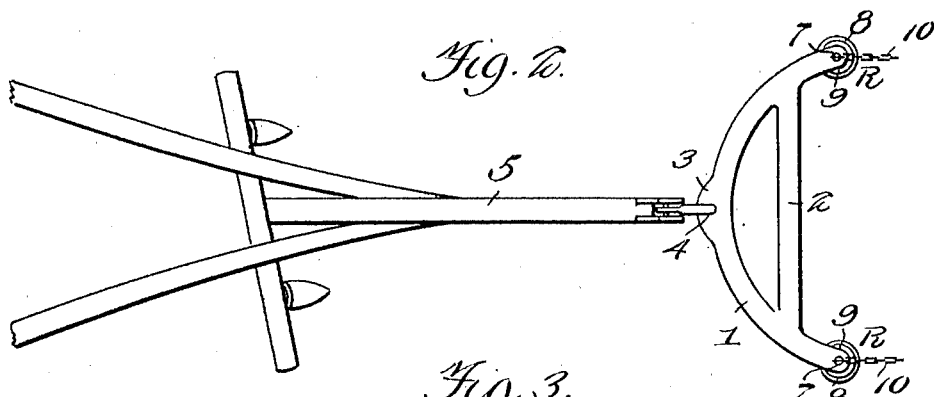
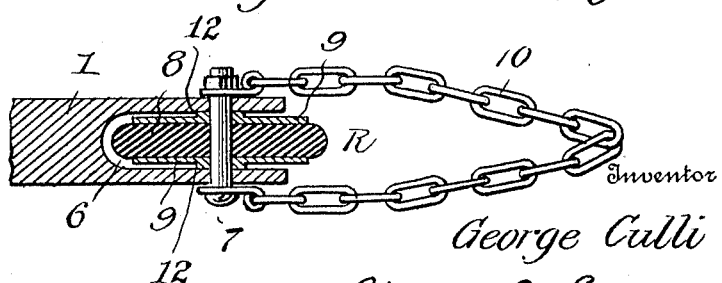
Witnesses
Hugh H. Ott.
Inventor
George Culli
By Victor J. Evans
Attorney

UNITED STATES PATENT OFFICE.

GEORGE CULLI, OF MILLSTADT, ILLINOIS.

WHIFFLETREE.

1,061,166.  Specification of Letters Patent.  Patented May 6, 1913.

Application filed September 6, 1911. Serial No. 647,844.

*To all whom it may concern:*

Be it known that I, GEORGE CULLI, a citizen of the United States, residing at Millstadt, in the county of St. Clair and State of Illinois, have invented new and useful Improvements in Whiffletrees, of which the following is a specification.

This invention relates to whiffletrees adapted especially to be used in connection with plows, cultivators and other agricultural implements when the same are used in vineyards, orchards or similar places or adjacent to picket or other fences which are liable to become injured by the action of ordinary whiffletrees rubbing thereagainst.

The invention has for its object to produce a whiffletree of simple and improved construction and of arcuate form so as to be readily and harmlessly guided past trees and other obstructions, the same being provided adjacent to the ends thereof with resilient rollers which will pass by trees without barking the same and pass other obstructions without injury thereto.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a top plan view of a whiffletree constructed in accordance with the invention. Fig. 2 is a top plan view showing the same applied to a plow. Fig. 3 is a sectional detail view taken on the line 3—3 in Fig. 1.

Corresponding parts in the several figures are denoted by like characters of reference.

The improved whiffletree consists of an arcuate member 1 extending through an arc of approximately 180 degrees, said arcuate member being reinforced by a cross bar or truss 2. The member 1 also has an enlargement 3 disposed midway between the ends thereof and provided with an aperture 4 for the reception of a clevis or other member, whereby it may be applied to the beam of a plow, as shown at 5 in Fig. 2 of the drawing.

The terminal ends of the arcuate member 1 are formed with horizontal recesses 6 which are vertically apertured for the passage of pins 7 upon which rollers R are journaled, each of said rollers being composed of a disk 8 of rubber or equivalent resilient material which is clamped securely between a pair of metallic washers 9, 9. The ends of the pivotal pins 7 are connected together by means of a flexible member such as a chain 10 affording means for the attachment of draft. The resilient disks 8 of the rollers are made of a diameter sufficiently exceeding the width of the terminal ends of the arcuate member 1 to positively prevent the latter from directly engaging trees and similar obstructions which instead will be engaged by the said resilient rollers without material injury thereto.

The washers 9 are each provided on its external face, that is to say, on the upper face of the upper washer and on the lower face of the bottom washer, with a central boss or projection 12, said bosses engaging the adjacent walls or faces of the recess 6, thereby relieving the greater portion of the face of each washer from frictional contact with the wall or face of the recess, and thereby improving and facilitating the operation of the device.

From the foregoing description, taken in connection with the drawing hereto annexed, the operation and advantages of the invention will be readily understood. It will be seen that the resilient rollers of the improved device by contacting with the trunks of trees and similar obstructions will prevent injury to such obstructions such as would likely be caused by direct contact with an ordinary whiffletree, thus preventing trees from being barked and injured and fences and the like from being disfigured.

Having thus described the invention, what is claimed as new, is:—

A whiffletree comprising an arcuate body having terminal horizontal recesses intersected by vertical apertures, bolts mounted within said apertures, a rotary buffer member mounted upon the bolt within each terminal recess, the outer periphery of each of said buffer members projecting outwardly past the side faces and corresponding end face of the whiffletree body, and draft attaching means connected to the extremities of each pivot bolt and adapted to extend forwardly therefrom.

In testimony whereof I affix my signature in presence of two witnesses.

GEORGE CULLI.

Witnesses:
GEORGE SANTHOFF,
PHIL SCHMIDT.

Copies of this patent may be obtained for five cents each, by addressing the "Commissioner of Patents, Washington, D. C."